INVENTOR
HENRI LOUIS LESIGNE,
by Adams+Bush
ATTORNEYS

Sept. 25, 1956  H. L. LESIGNE  2,764,635
DEVICE FOR SELECTING P.B.X LINES
Filed June 27, 1952  6 Sheets-Sheet 2

INVENTOR
HENRI LOUIS LESIGNE,
by  Adams + Bush
ATTORNEYS

Sept. 25, 1956 H. L. LESIGNE 2,764,635
DEVICE FOR SELECTING P.B.X LINES
Filed June 27, 1952 6 Sheets-Sheet 3

INVENTOR
HENRI LOUIS LESIGNE
by Adams & Bush
ATTORNEYS

Sept. 25, 1956     H. L. LESIGNE     2,764,635
DEVICE FOR SELECTING P.B.X LINES

Filed June 27, 1952     6 Sheets-Sheet 6

INVENTOR
HENRI LOUIS LESIGNE,
by Adams + Bush
ATTORNEYS

United States Patent Office 2,764,635
Patented Sept. 25, 1956

2,764,635

DEVICE FOR SELECTING P. B. X LINES

Henri Louis Lesigne, Vanves, France, assignor to Compagnie Industrielle des Téléphones, Paris, France, a French corporation Application June 27, 1952, Serial No. 296,041
Claims priority, application France March 15, 1949

7 Claims. (Cl. 179—18)

This application is a continuation in part of my application Serial No. 149,636, filed March 14, 1950 now abandoned.

In automatic switching systems for telecommunications means are provided by which, several grouped lines, also commonly called P. B. X lines, allotted to the same subscriber, may be reached and tested when a single number is sent. The busy signal is sent if no line of the group has been found free.

The present invention is applicable to installations comprising grouped lines and at least one main register, from which the selectors of the successive selection stages are set by marking.

According to the invention the installation comprises an auxiliary register, means for connecting the auxiliary register to the selection chain when all lines of the group are busy, and means enabling the auxiliary register to take the place of the engaged main register when a line of the group has become free and to again test the several lines of the group.

When the P. B. X group of lines comprises a small number of lines, say at most five, it is preferable to connect them, as the other lines, to the connectors allotted to a single hundred of lines. Such a group will be called hereinafter a "small group." When, on the contrary, the P. B. X group of lines comprises a relatively high number of lines, say more than five, it is preferable to connect them to the connectors allotted to at least two different hundreds of lines. Such a group will be called hereinafter a "large group."

Figure 1:
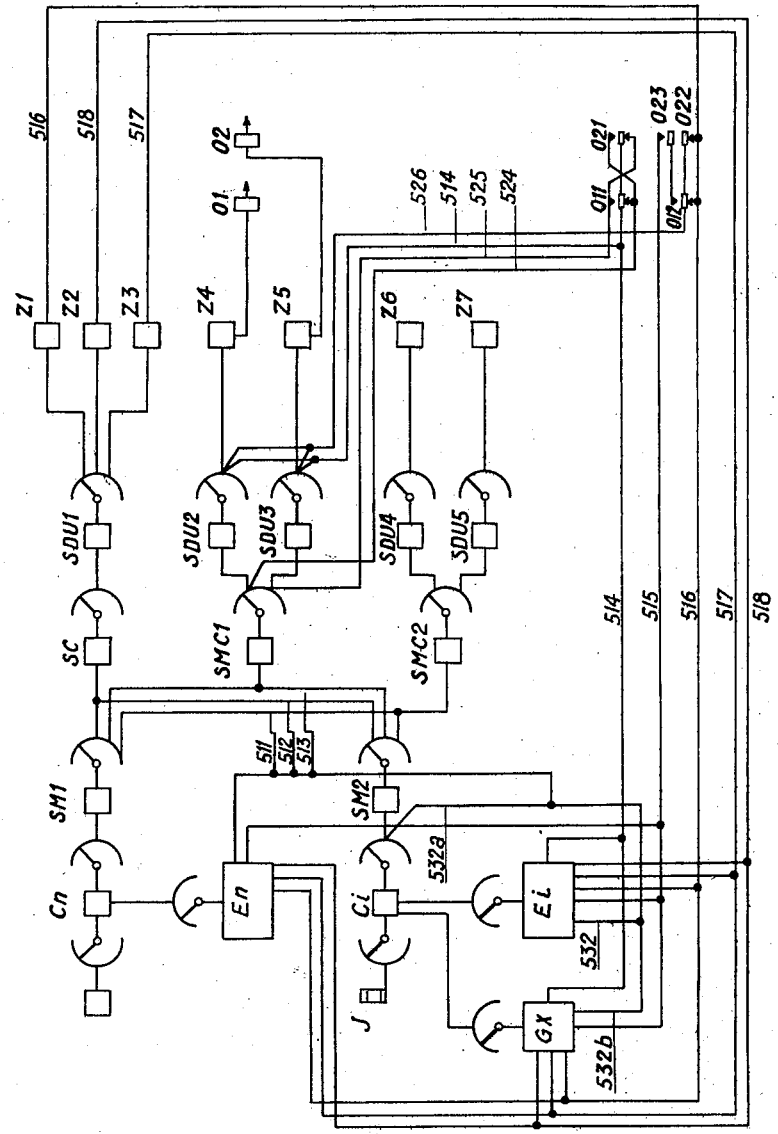

The invention will now be described with reference to the accompanying drawings in which:

Fig. 1 is a diagram of the system.

Figure 2A:
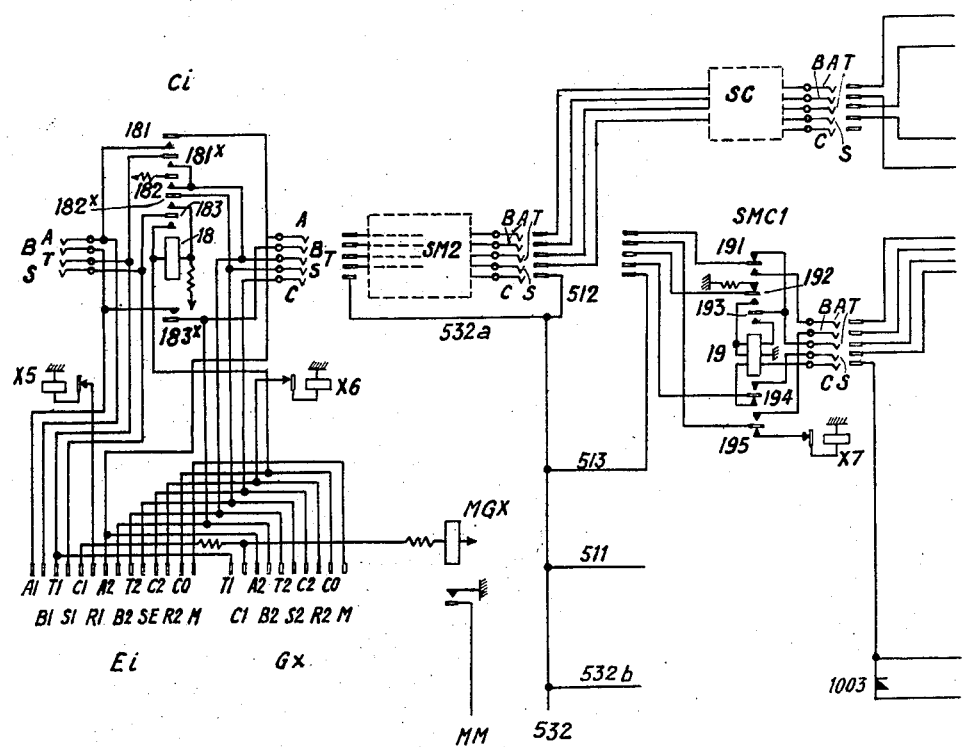
Figure 2B:
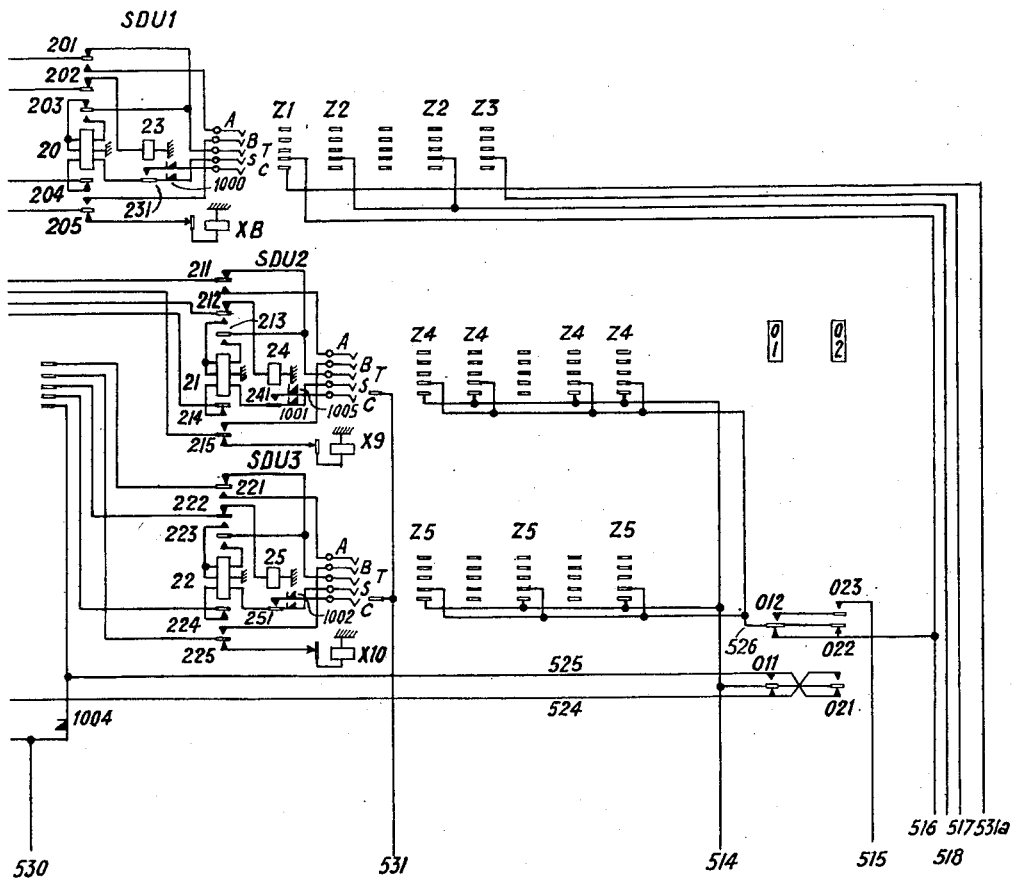

Figs. 2a and 2b provide a simplified diagram of the selectors and marking wires of the P. B. X lines. This diagram is obtained by placing Fig. 2b on the right of Fig. 2a.

Figure 3A:
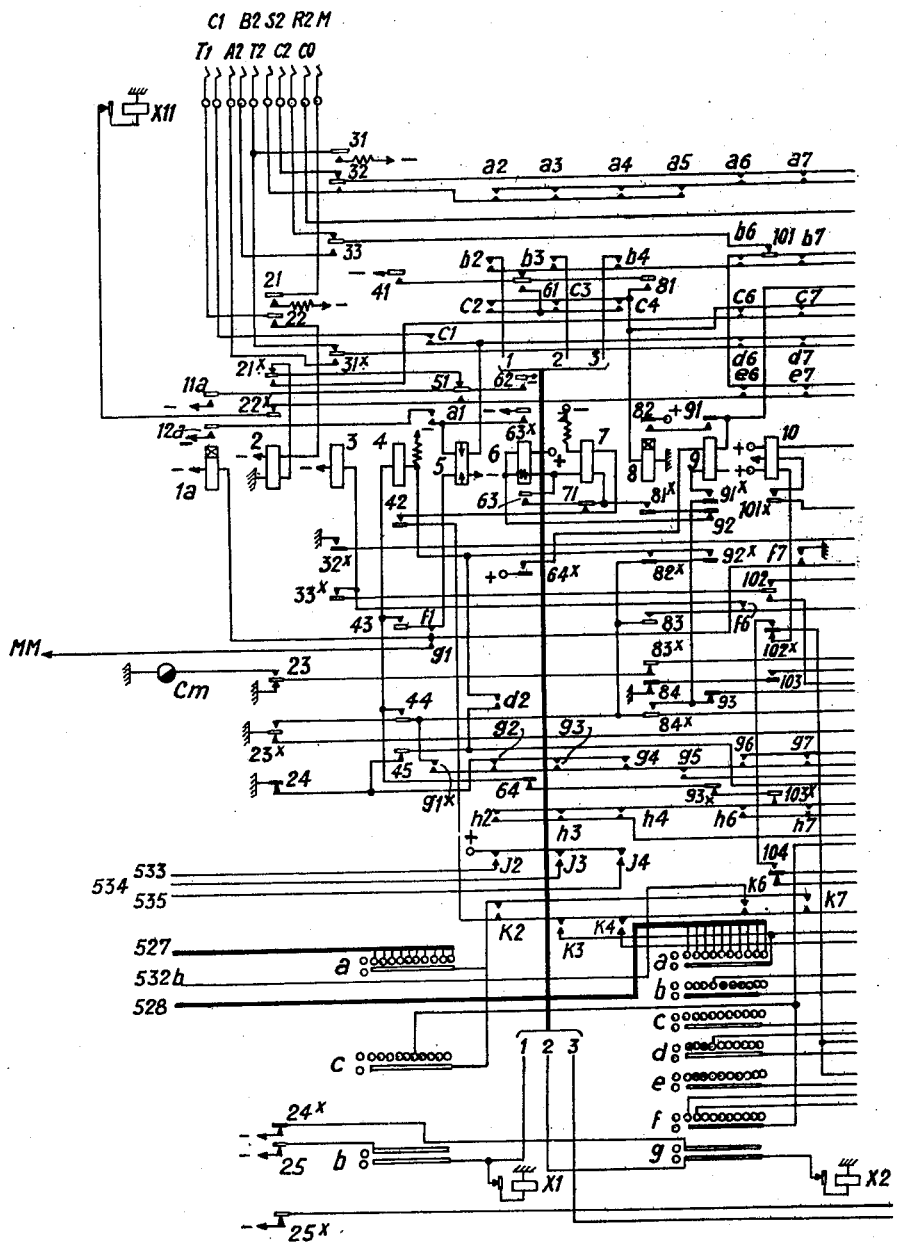
Figure 3B:
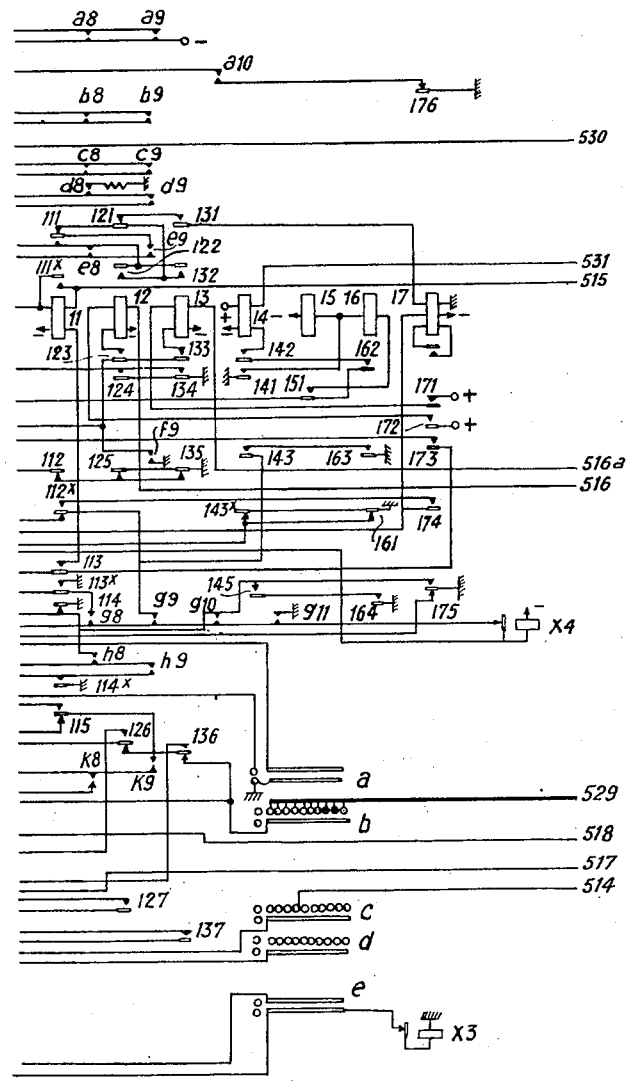

Figs. 3a and 3b provide a simplified diagram of an auxiliary register. This diagram is obtained by placing Fig. 3b on the right of Fig. 3a.

Figure 4:
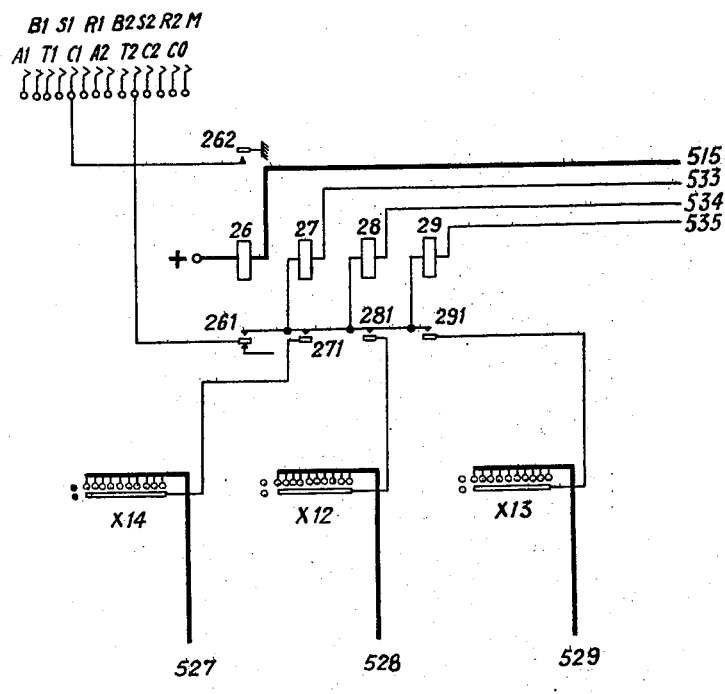

Fig. 4 shows the portion of the main register which allows of carrying over to the auxiliary register the hundreds, tens and units digits.

The same reference character designates the same part in the different figures.

In Figs. 1, 2a and 2b, the following references designate the following parts: $Ei$, a main register; $Ci$, a link circuit, comprising an outgoing selector on the right; SM1 and SM2, thousands selectors; SC, SMC1 and SMC2, hundreds selectors; SDU1 to SDU5, tens and units selectors, also called connectors; Z1, first line, Z2, intermediate lines and Z3, last line of a small group; Z4 and Z5, lines of a first large group; Z6 and Z7, lines of a second large group.

The nature of the members designated by the other reference characters of Figs. 1, 2a and 2b will be stated later.

A number of the members not shown in Fig. 4 which play a part in the operation of the installation which will be described by way of example also exist unmodified in the register $Gx$ which will be described later. In the embodiment of the present invention which is illustrated herein and which will be described more fully hereinafter each main register and each auxiliary register comprises an individual battery having no point in common with that of any other main or auxiliary register. The terminals of an individual battery are designated by a small circle near a + or — sign. They will be designated in the following by + and — respectively. The free pole of the general supply battery is designated by an arrow and the — sign. It will be designated by the word battery.

The electro-magnet X6 (Fig. 2a) of the selector which is part of the link circuit $Ci$ is stepped over wiper R2 of $Ei$. This selector is set from $Ei$ by means of marking wire 532—532a, wiper C of $Ci$ and wiper C2 of $Ei$.

The following selector SM2 is set from $Ei$ by means of marking wire 532—512. Its different parts have not been represented. They are the same as those of the selector SMC1 of the following stage, whose operation will be described later.

From now on and until further notice only the case of large groups will be examined.

SMC1 is set by means of the marking wire 530. The driving electro-magnet X7 of SMC1 is actuated over contact 195, contacts and wipers B of SM2 and $Ci$ and contact and wiper B2 of $Ei$.

The marking wire 530 is connected not only to relay 9 (Fig. 3a) of the auxiliary register $Gx$ (Figs. 3a and 3b) as shown, but also to a contact of a bank of the hundreds digit switch of each main register $Ei$, and the wiper of this bank is connected in known manner to a contact of a contact bank of the thousands digit switch. This contact corresponds to a digit reserved for the large groups so that the calling number of a subscriber who has not a large number of lines does not comprise this thousands digit.

Wire 530 (Fig. 2b) divides into two branches having access to contacts corresponding to two hundreds. We are therefore in the above mentioned case where the lines of the large group are connected to the connectors allotted to two different hundreds of lines.

When the wiper C of SMC1 (Fig. 2a) encounters one of these two branches, there is closed a marking circuit comprising: wire 530, rectifier 1003 or 1004, contact and wiper C of selector SMC1, lower winding of connection relay 19, contact 194, contact and wiper S of SM2, contact and wiper S of $Ci$, contact and wiper S2 of $Ei$.

An idle connector SDU2 or SDU3 (Fig. 2b) is characterized by its relay 21 or 22 being unenergized. Therefore if the test wiper T of SMC1 encounters an idle connector after the marking circuit of SMC1 has been closed, a ground is placed on the test relay of register $Ei$ over the engagement relay 24 or 25 of the connector, contact 212 or 222 and the whole selection chain to the register. The test relay thus opens in known manner the stepping circuit of X7 (Fig. 2a).

On the other hand, the operation of the test relay of the register brings about in known manner an increase of voltage on the lower winding of the connection relay 9 (Fig. 2a) which operates and is held by its middle winding over contact 192 and wire T to the register. Relay 24 or 25 (Fig. 2b) also operates and thus places the connector wiper C on the marking circuit at 241 or 251.

Relay 24 or 25 is held over 212 or 222, contact and wiper T of SMC1, 193, upper winding of 19, 192, then contact and wiper T of SM2 to the register $Ei$.

The electro-magnet X9 of connector SDU2 (Fig. 2b)

or the electromagnet X10 of connector SDU3 is actuated over 215 or 225, contact and wiper B of SMC1, 195, then contacts and wipers B of SM2 and C$i$, contact and wiper B2 of E$i$.

Connector SDU2 or SDU3 is set by means of the two marking wires 531 and 514. Wire 531 is branched on a zero position ahead of the first line of the group and informs the register E$i$ that it is calling a P. B. X line. Wire 514 designates all the lines of the group to E$i$, which sets SDU2 or SDU3 by means identical with those which will be described later for G$x$.

A busy relay O1 is energized when all lines Z4 are busy. Its winding is, for instance, connected in known manner in series with a contact of the busy relays of all the lines Z4. A busy relay O2 is similarly energized when all lines Z5 are busy. When both relays O1 and O2 are energized wire 516 is disconnected at contacts O12 and O23. The disconnection of this wire, which is connected to register E$i$, informs it of the congestion of the group and puts an end to the test.

The operation of both relays O1 and O2 closes the following circuit: +, (Fig. 4), relay 26, wire 515, then (Fig. 2b) contacts O23 and O12, wire 526, rectifier 1001 or 1002, relay 21 or 22, contact 214 or 224, contact and wiper S of SMC1 (Fig. 2a), 194, contact and brush S of SM2 and C$i$, contact and wiper S2 of E$i$, contact 261 (Fig. 4) and — (not shown).

The closure of this circuit causes relay 26 to operate. Relay MGX (Fig. 2a) operates over contact 262 of relay 26 and wiper C1 and connects a ground to the starting wire MM of G$x$ (Fig. 3a). Relay 1a and the differential relay 5 of G$x$ are thus energized over contacts g1 and f1 of sequence switch X4 in position 1.

Relay 5 steps electro-magnet X11 of the finder of G$x$ over 22$^x$, 51, 11a and battery. When the engaged link circuit is found relay 5 falls back because its upper winding is fed over battery, 12a, a1, winding of 5, c1 of X4, wiper and contact C1 of X11, then (Fig. 2a) resistance, contact C1 of register E$i$, then further (Fig. 4) wiper C1 of register E$i$, 262 and ground.

The release of 5 (Fig. 3a) stops X11, which therefore shunts G$x$ on E$i$; relay 2 operates over ground, lower winding of 2, 21$^x$, 51, 11a and battery, and is held over battery, upper winding of 2, 22, wiper T1 of X11 then (Fig. 2a), contact T1 of X11, wiper T of the call finder shown on the left of C$i$ and ground on the calling line.

The sequence switch X4 (Fig. 3b) steps from position 1 to position 2 over battery, winding and interrupter of X4, g1$^x$ (Fig. 3a), 23$^x$, and ground.

Relay 4 of G$x$ operates over battery, resistance, winding of 4, 64, 93$^x$, 103$^x$, h2 of X4, home contact of bank a of X3 (Fig. 3b) and ground. It is held over 44, 23$^x$, and ground.

Relay 1a, whose circuit is opened at g1, is released.

Relays 10 and 11 operate in series over: +, windings of 10 and 11 in series, wire 515, then (Fig. 2b) O23, O12, wire 526, contact and wiper S of SDU2 or SDU3 on the last line of Z4 or Z5, rectifier 1001 or 1002, lower winding of 21 or 22, 214 or 224, contact and wiper S of SMC1 (Fig. 2a), 194, contact and wiper S of SM2 and C$i$, contact S2 of G$x$, then (Fig. 3a) wiper S2, a2 of X4 and —.

Relay 11 is held over 113, 23$^x$ and ground.

17 is energized over its middle winding, 103, 84 and ground.

Relay 27 (Fig. 4) of register E$i$ operates over + (Fig. 3a), j2, of X4 of G$x$, wire 533, winding of relay 27 (Fig. 4), 261, wiper and contact S2 of E$i$, then (Fig. 3a), contact and wiper S2 of G$x$, a2 of X4 and —.

X1 (Fig. 3a) is stepped over battery, 41, 61, b2 of X4, wire 1, interrupter and winding of X1 and ground.

Relay 6 is energized when X1 encounters the hundreds digit on the digit switch X14 of register E$i$ (Fig. 4) over the circuit: + (Fig. 3a), winding and resistance of 6, 63, 71, 42, k2 of X4, contact bank a of X1, one wire of group of wires 527, then (Fig. 4), the bank shown of the hundreds digit switch X14 of register E$i$, 271, 261, wiper S2, then (Fig. 2a) contact S2 of E$i$, contact S2 of G$x$, then (Fig. 3a), wiper S2, a2 of X4, —.

The operation of relay 6 stops X1, whose circuit is disconnected at 61.

8 operates over c2 of X4, 61, 41 and battery.

The electro-magnet of X4 is energized over 93, 84$^x$, 23$^x$ and ground.

Relay 4, whose winding is short-circuited by 82$^x$, 23$^x$ and ground, releases and releases 6 and 8, the circuit of X4 is disconnected at 84$^x$ and X4 therefore steps from position 2 to position 3.

By a succession of operations identical with those which have just been described in position 2 of X4 for the transfer on X1 (Fig. 3a) of the hundreds digit marked by X14 (Fig. 4) the tens and units digits are transferred from X12 and X13 of E$i$ to X2 and X3 of G$x$ in positions 3 and 4 respectively. The circuits respectively pass over j3 of X4, wire 534, relay 28, a wire 528 and a3 of X4 for the tens digit and over j4 of X4, wire 535, relay 29, a wire 529 and a4 of X4 for the units digit.

In position 4 of X4, relays 4, 6 and 8 have been restored to their unactuated condition as above described in position 2, and X4 is therefore stepped to position 5.

When one of the lines Z4 and Z5 (Fig. 2b) is liberated one of the two contacts O12 and O23 opens, the circuit traced above which passes through relay 10 (Fig. 3b) is opened, this relay is released, relay 17 is released through the opening of contact 103 and X4 steps from position 5 to position 6 over its interrupter, g5, 175 and ground.

As already mentioned above 11 is held over its lower winding, 113, 23$^x$ and ground.

On the other hand as wire 515 also passes over relay 26 (Fig. 4) of E$i$, this relay is also released. Through a circuit of register E$i$ which has not been illustrated the release of relay 26 causes the short-circuit of the engagement relay of this register, which is thus released. The release of this register liberates the whole selection chain, especially the selector SM2 of the chain. On account of this the relay of SM2 which is similar to relay 19 of SMC1 is released and the ground connected to the back contact of this relay which is similar to contact 192 of SMC1 is connected over contact and wiper T of C$i$ to contact and wiper T2 of G$x$.

Relay 4 of G$x$ (Fig. 3a) operates over 64, 93$^x$, 103$^x$, h6, 114$^x$ and ground. It is held over 44, 23$^x$ and ground.

As had taken place in each of positions 2, 3 and 4 of X4 but without any consequences deriving therefrom in these positions relay 5 operates over its lower winding, 43, 44 and 23$^x$.

Relay 6 operates over +, windings of 6, 63, 71, 42, k6, wire 532b—532a, contact and wiper C of C$i$ (Fig. 2a), contact and wiper C2 of G$x$ (Fig. 3a), 32, a6, —.

The upper winding of 5 is fed over 63$^x$, d6, 31$^x$, wiper T2, contact T2 (Fig. 2a), wiper and contact T of selector C$i$ and ground on the contact (not shown), similar to contact 192 of SMC1, of the selector SM2 which has just been liberated. Relay 5 releases.

8 (Fig. 3a) operates over c6, 21$^x$, 51, 62 and battery and is held over 81 and 41.

3 operates over f6, 83, 23$^x$ and ground and is held over 33$^x$, 102, 143$^x$ and 161 in parallel and ground.

X4 is energized over 93, 84$^x$, 23$^x$ and ground.

The resistance of relay 6 is short-circuited at 81$^x$, whereby the relay (not shown) of SM2 which is similar to relay 19 of SMC1 is actuated, the circuit being as follows: +, upper winding of 6, 92, 81$^x$, 71, 42, k6, wire 532b—512 (Fig. 2a), relay of SM2, contact (similar to 194 of 19) of this relay, contact and wiper S of C$i$, contact and wiper S2 of G$x$ (Fig. 3a), 32, a6 and —.

The relay of SM2 is held over battery, resistance 31, wiper and contact T2 of G$x$, wiper and contact T of Ci, relay contact of SM2 similar to contact 192 of SMC1, middle winding of relay of SM2 and ground.

4 is short-circuited over 82ˣ, 23ˣ and ground and releases.

8, whose circuit is opened at 41, releases.

6, whose circuit is opened at 42, releases.

The circuit of X4 is opened at 84ˣ and X4 steps from position 6 to position 7.

The circuits of the lower and upper windings of 5 are opened, the first at 43 and 44, the second at 63ˣ and d6, and 5 remains unenergized.

4 operates over 64, 93ˣ, 103ˣ, h7, 114ˣ and ground and is held over 44, 23ˣ and ground.

5 operates over its lower winding, 43, 44, 23ˣ and ground.

1a operates over f7.

The selector SMC1 which was part of the selection chain previously established under the control of Ei and on which SM2 has therefore stopped may have stopped on the group of connectors SDU2 or SDU3 in which a line has just been liberated or, on the contrary, on the other group.

The first case will be considered first, and it will be assumed that a line has been liberated in the group SDU2 and that therefore relay O1 has released. The marking wire 514 is thus connected over O11 and wire 524 to the contacts of SMC1 which have access to group SDU2.

6 operates over +, winding and resistance of 6, 63, 71, 42, k7, wiper and contact of bank c of X1, wiper and contact of bank f of X2, wiper and contact of bank c of X3, wire 514, then (Fig. 2b) O11 in back position and O21 in front position in parallel wire 524, contact and wiper C of SMC1, winding of 19, 194, contact and wiper S of SM2 and Ci, contact and wiper S2 of Gx (Fig. 3a), 32, a7 and —.

The upper winding of relay 5 (Fig. 3a) is fed in a manner similar to that in which it had been fed in position 6 of the sequence switch. But now relay 24 (Fig. 2b) is energized in series therewith. The circuit is as follows: battery (Fig. 3a) 63ˣ, upper winding of 5, d7, 31ˣ, wiper and contact A2 of Gx then (Fig. 2a) wiper and contact A of Ci and SM2, 191, wiper and contact T of SMC1, 212, winding of 24 and ground.

24 operates and 5 releases.

As in position 6, 8 operates and the resistance of 6 is short-circuited at 81ˣ. The sole difference is that the circuits are now over the contacts of sequence switch X4 in position 7.

Relay 19 of SMC1 is energized over +, winding of 6, 92, 81ˣ, 71, 42, k7, contacts c of X1, f of X2 and c of X3, wire 514 then (Fig. 2b), wire 524, contact and wiper C of SMC1, winding of 19, 194, contact and wiper S of SM2 and Ci, contact and wiper S2 of Gx then (Fig. 3a) 32, a7 and —.

24 is held over 193 in parallel with the middle winding of relay 19.

Relays 4, 6 and 8 release as in position 6 and X4 steps from position 7 to position 8.

X4 is energized over g8 and 113ˣ through its interrupter. It therefore steps to position 9.

4 operates as in positions 6 and 7 but over h9 and re-energizes 5.

6 operates again over +, winding and resistance of 6, 63, 71, 42, k9, 115, contacts f of X2 and c of X3, wire 514, then (Fig. 2b) contact and wiper C of SDU2, rectifier 1005, 241, lower winding of 21, 214, contact and wiper S of SMC1 and the continuation of the marking circuit to a9 and —.

X9 rotates over battery, 62, 51, e9, 111, 101, 33, wiper and contact B2 of Gx, wiper and contact B of SM2, 195, wiper and contact B of SMC1, 215, X9 and ground.

Let us first assume that the starting position of SDU2 is such that the liberated line lies in front of the zero position of the lines Z4. The upper winding of 5 is then fed over battery, 63ˣ, upper winding of 5, d9, 31ˣ, wiper and contact A2, wiper and contact A of Ci, SM2 and SMC1, 211, wiper T and ground on the free line.

5 releases and, as in the preceding stages, 8 operates and then 4, 8 and 6 release. As had previously done 19, 21 operates and connects the engaged line to the link circuit over its front contacts.

X4, whose circuit is opened at 84ˣ, steps from position 9 to position 10.

Relay 18 of Ci operates over battery, resistance, winding of 18, contact and wiper C0 of Gx, a10, 176 and ground.

Relay 2, shunted over battery, resistance, 182 and 181ˣ, falls back. The battery at 182 holds the whole selection chain.

X1, X2 and X3 are homed over contacts 25, 24ˣ and 25ˣ respectively.

11, whose circuit is opened at 23ˣ, falls back.

X4 steps from position 10 to position 11 over g10 and 114, then from position 11 to position 1 over g11.

All the relays of Gx which had operated during the preceding operations have again fallen back and Gx is liberated.

Let us now assume that the starting position of SDU2 is such that the zero position of the lines Z4 lies ahead of the liberated line. In that case, when SDU2 passes over this position, relay 14 of Gx operates over +, upper winding of 14, wire 531, contact and wiper C of SDU2 (Fig. 2b), rectifier 1005, winding of 21 and the chain already repeatedly described to a9 (Fig. 3b) and —.

15 operates over 141 and is held over the winding of 16, 151, 32ˣ and ground.

16, placed between the two grounds at 141 and 32ˣ, is not energized.

When SDU2 leaves the zero position 14 falls back; 16, whose short-circuit is opened at 142, operates in series with 15.

The rotation of SDU2 proceeds until it finds the free line. As has been stated above, relay 5 is then released and stops the rotation of SDU2.

If in the meantime the liberated line has been seized SDU2 again passes over the zero position and 14 again operates. It is held over its lower winding, 142, 162, 32ˣ and ground.

X4 passes from position 9 to position 10 over g9, 143, 163 and ground.

Relay 3, whose holding circuit is opened at 143ˣ and 161, falls back and removes the battery which held the whole selection chain over 31.

X4 successively steps to positions 11 over g10, 145 and 164, 1 over g11 and 2 over g1 and 23ˣ.

Relay 4 is short-circuited over d2, bank a of X3 and ground is released.

X4 then steps to positions 3, 4, 5 over g2, g3 and g4 respectively, 45 and bank a of X3.

10 operates again over its upper winding and wire 515.

17 operates again over its middle winding, 103, 84 and ground.

The circuit of X4 is opened at 175. When a line is liberated relays 10 and 17 are released, X4 steps from position 5 to position 6 over 175 and the operations are resumed from this position as already above explained.

Let us now consider the case where, the sequence switch being in position 7, the group SDU2 or SDU3 of connectors in which a line has just been liberated is not that on which has stopped the selector SMC1 of the selection chain. Let us assume for instance that SMC1 has stopped on group SDU2 and that a line has been liberated in group SDU3.

In that case O1 is operated and 6 no longer operates because there is no connection at O11 between wire 524 and the marking wire C of SMC1.

X7 steps over the two following circuits: battery, 41, 61, b7, 101, 33, wiper and contact B2 of Gx, wiper and contact B of Ci and SM2, 195, X7 and ground; battery, 11a, 51, e7, then 101, 33, etc.

When wiper C of SMC1 encounters wire 525, relay 6 operates over a circuit which differs from that traced in the first case (line liberated in group SDU2) only in that it passes over front contact O11 and back contact O21 and wire 525. There then only remains the second of these two stepping circuits of X7.

When an idle connector is encountered the upper winding of 5 is fed over battery, $63^x$, upper winding of 5, $d7$, $31^x$, wiper and contact A2 of $Gx$, wiper and contact A of $Ci$ and SM2, 191, wiper and contact T of SMC1, 22 and winding of 25.

5 falls back and 25 operates.

The circuit of X7 is opened at 51 and the stepping of SMC1 is stopped.

The continuation of the operations is then identical with the above described succession of operations which take place in the first case (line liberated in group SDU2).

Figs. 3a and 3b show, independently of the members above described, a relay 13 and its contacts, banks c and e of X2 and bank d of X3. These different members are provided for the connection of other P. B. X lines.

Let us now consider the case of the small groups.

The first line is marked by wire 516 (Figs. 3b and 2b), the intermediate lines by wire 518 and the last line by wire 517. Wire 531a (Fig. 2b) is connected to $Ei$ and informs it that it is in presence of P. B. X lines.

It is assumed that the main register $Ei$ has tested all the lines and found all of them busy. Wire 517 (Fig. 2b) is part of a circuit which causes the operation of a busy relay in $Ei$ if all lines are busy. The operation of this relay causes the operation of relay 26 of $Ei$ (Fig. 4) by a circuit not shown. This relay in its turn causes the engagement of an auxiliary register $Gx$ and the transfer of the digits of X14, X12 and X13 of $Ei$ over X1, X2 and X3 of $Gx$ in the conditions stated above in the case of large groups. By means of the sequence switch, not shown, of the register the transfer of the digits is followed by the release of relay 26, which brings about the release of register $Ei$. Position 5 of sequence switch X4 is thus reached. But in this case wire 515 is no longer made use of and relays 10, 11 and 17 of $Gx$ therefore remained unenergized in position 2. X4 therefore immediately steps to position 6 over $g5$, 175 and ground. 3 operates over $f6$, 112, 125 and 135 in parallel and ground. It is held over $33^x$, 102, $143^x$ and 161 in parallel and ground.

X4 passes over positions 6 and 7 over $g6$ and $g7$ respectively, 114 and ground and reaches position 8.

4 operates over 64, $93^x$, $103^x$, $h8$, 114 and ground and is held over 44, $23^x$ and ground.

5 operates over its lower winding, 43, 44, $23^x$ and ground.

The stepping electro-magnet X8 of connector SDU1 (Fig. 2b) is energized over 205, wiper and contact B or B2 of the chain already mentioned several times, 33 (Fig. 3a), 191, $b8$, 61, 41 and battery.

SDU1 starts from the last line of the group. When it encounters the marking wire of the tens digit of the number allotted to the group, relay 6 (Fig. 3a) operates over +, winding and resistance of 6, 63, 71, 42, $k8$, a contact $a$ of X2, one wire of cable 528, wire 516 (Fig. 2b) which is connected in shunt with that wire of cable 528, contact and wiper S and S2 of the whole chain, 32, $a8$ and —.

5 whose upper winding is fed over $63^x$, upper winding of 5, $d8$, resistance and ground, is released.

8 operates over $c8$, $21^x$, 51, 62 and battery and is held over 81, 41 and battery.

X4 is energized over 93, $84^x$, $23^x$, and ground.

4, whose winding is short-circuited at $82^x$, falls back.

6, whose circuit is opened at 42, is released.

8, which is slow-releasing and whose holding circuit is opened at 41, is released.

4, is again operated over 64, $93^x$, $103^x$, $h8$, 114 and ground.

X4, whose circuit is opened at $84^x$, steps from position 8 to position 9.

4 is held over 44, $23^x$ and ground, 5 again operates over its lower winding, and X8 is again energized as previously but over $b9$ instead of $b8$.

When the first line Z1 of the group is encountered 6 is energized over 63, 71, 42, $k9$, 115, 104, 126, 136, one contact $b$ of X3, and one wire of wire cable 529, and wire 516 (Fig. 2b), which is also connected in shunt to this wire of cable 529.

This line is in general still busy and relay 5 therefore remains energized.

17 operates over its upper winding, 131, 121, 111, $e9$, 51, 62 and battery.

12 operates over +, 172, upper winding of relay 12, wire 516, contact and wiper S and S2 of the whole chain, 32 (Fig. 3a) $a9$ and —. It is held over 123, $f9$ and ground.

17, whose circuit is opened at 126, is released.

Since relay 5 has remained energized, the stepping of SDU1 continues.

The marking takes place on the intermediate lines over wire 518.

These lines will be in general still busy and relay 5 will therefore remain energized.

Wire 517 relative to the last line is connected to relay 10. In general this line is still busy. 10 then operates over its lower winding, $102^x$, 127, contact $d$ of X2, wire 517, contact and wiper S and S2 of the whole chain, 32 (Fig. 3a) and $e9$. It is held over its middle winding, $101^x$, 124 and ground.

X8, whose circuit is opened at 101, stops.

6 remains energized over 63, 71, 42, $k9$, 115, 104, $102^x$, 127, contact $d$ of X2, wire 517, contact and wiper S, etc., 32, $a9$ and —.

17 operates over its middle winding, 103, 84 and ground.

$Gx$ remains in the same condition until cam $Cm$, which closes its contact every 10 seconds, causes X4 to step from position 9 to position 10 over $g9$, $112^x$, $83^x$, 23, cam $Cm$ and ground.

X4 steps over positions 10 over $g10$, 175 and ground, 11 over $g11$ and 1 over $g1$, $23^x$ and ground.

In position 2, 8 operates over $c2$, 61, 41 and ground.

17, whose holding circuit is opened at 84, is released.

12, whose circuit is opened at 172, is released.

10, whose circuit is opened at 127, is released.

4 is short-circuited over $d2$, bank $a$ of X3 and ground and is released.

5, whose circuit is opened by the release of 4, is also released.

X4 steps over positions 2, 3 and 4 over $g2$, $g3$ and $g4$ respectively, 45, bank $a$ of X3 and ground; 5 over $g7$, 175 and ground; 6 and 7 over $g6$ and $g7$ respectively, 114 and ground. It arrives in position 8, where the test of the lines is resumed as previously.

Fig. 1 shows a jack J. This jack is utilised by the toll operators for connecting a calling line to a link circuit $Ci$, which is therefore a toll link circuit.

The same figure also shows a link circuit $Cn$ connected to a register $En$. Registers $Ei$ and $En$ can only engage link circuits $Ci$ and $Cn$ respectively. The figure also shows thousands selectors SM1. Thousands selectors SM2 and SM1 are set by registers $Ei$ and $En$ respectively. All of them have access to all selectors SMC1 and SMC2. The auxiliary registers $Gx$ are not connected to the link circuits $Cn$. In practice the subscribers connected to the link circuits $Cn$ are the subscribers other than the toll subscribers. In the event all lines of a group are busy, they receive the usual busy tone.

I claim:

1. An automatic switching system for telecommunications comprising: registers containing digit switches having terminals; finders; link circuits, each of which may be connected to any register over one of said finders; a plurality of connectors each of which comprises a control wiper, a test wiper and two talking wipers and corresponding rows of test and control terminals; means for simultaneously connecting said control and said test wiper of any of said connectors to any of said registers over one of said finders; a plurality of line wires multipled on said test and talking terminals of said plurality of connectors; means including control wires connecting said terminals of said digit switches with said control terminals of said connectors for setting said connectors and for testing a plurality of said lines under the control of said digit switches; a busy relay operated when all said lines are busy; a guarding and control circuit containing digit switches having terminals; means for causing the operation of said busy relay to connect said link circuit with said guarding and control circuit at the same time as with said register; means for setting said digit switches in said guarding and control circuit under the control of said digit switches in said register; and control and testing means in said guarding and control circuit including control wires connecting said terminals of said digit switches of said guarding and control circuit with said control terminals of said connectors for setting said connectors under the control of said digit switches of said circuit and for testing said lines.

2. An automatic switching system for telecommunications according to claim 1, comprising means for periodically actuating said testing means of said guarding and control circuit.

3. An automatic switching system for telecommunications according to claim 1, comprising means responsive to the operation of said busy relay for actuating said testing means of said guarding and control circuit.

4. An automatic switching system for telecommunications according to claim 1, comprising: a second plurality of connectors; a second plurality of line wires multipled on said test and talking terminals of said second plurality of connectors; a second busy relay operated when all line wires of said second plurality of line wires are busy; a plurality of intermediate-stage selectors arranged between said link circuits and said connectors and over which said control and test wipers of said connectors are connected to said registers, each connector of both pluralities of connectors being trunked to a terminal of each selector; in said connectors and selectors a second row of control terminals; and a control wire dividing into three branches, the first of which is multipled on the control terminals of said second row of control terminals of both pluralities of connectors which correspond to said lines, and the second and third of which are controlled by said two busy relays respectively and are multipled on the control terminals of said second row of control terminals of said selectors which correspond to said control terminals of said first mentioned rows of control terminals on which are multipled said first and said second pluralities of connectors respectively.

5. An automatic switching system for telecommunications comprising: registers containing digit switches; link circuits; connectors; means for setting, over said link circuits, said connectors under the control of said digit switches of said registers; a plurality of subscribers lines each of which is multipled to a set of contacts of a plurality of said connectors; a guarding and control circuit containing digit switches; means in said registers responsive to the busy condition of all lines of said plurality of lines for connecting said link circuits to said guarding and control circuit and for transferring to said digit switches of said guarding and control circuit the digits received by said digit switches of said registers; and means in said guarding and control circuit for setting, over said link circuits, said connectors under the control of said digit switches of said guarding and control circuit.

6. An automatic switching system for telecommunications as set forth in claim 5, in which said means in said guarding and control circuit for setting said connectors is periodically actuated.

7. An automatic switching system for telecommunications as set forth in claim 5, in which said guarding and control circuit contains means responsive to the release of a line for operating said means in said guarding and control circuit to set said connectors.

References Cited in the file of this patent

UNITED STATES PATENTS

| | | |
|---|---|---|
| 2,504,274 | Nilsson et al. | Apr. 18, 1950 |
| 2,598,822 | Obermann | June 3, 1952 |